United States Patent [19]

Lunn

[11] 3,840,697

[45] Oct. 8, 1974

[54] COLOR TELEVISION SIGNAL DEMODULATION SYSTEM

[75] Inventor: Gerald K. Lunn, Carleton, England

[73] Assignee: Motorola, Inc., Franklin Park, Ill.

[22] Filed: May 31, 1973

[21] Appl. No.: 365,705

[52] U.S. Cl. ........................................ 358/23

[51] Int. Cl. ........................................ H04n 9/50

[58] Field of Search ....... 178/5.4 SD, 5.4 R, 5.4 SY; 329/50

[56] References Cited

UNITED STATES PATENTS

| | | | |
|---|---|---|---|
| 3,506,776 | 4/1970 | Rennick | 178/5.4 |
| 3,624,275 | 11/1971 | Lunn | 178/5.4 |

*Primary Examiner*—Richard Murray
*Assistant Examiner*—R. John Godfrey
*Attorney, Agent, or Firm*—Mueller, Aichele & Ptak

[57] ABSTRACT

A silicon monolithic integrated circuit consists of two sets of full-wave, synchronous, gated, transistor demodulators for demodulating the red and blue color difference signals present in a composite television signal. The demodulated chroma signals then are passed through PNP turn-around circuits, which effectively filter out the high frequency detector switching products, to a resistor matrix coupled to the bases of three emitter-follower output amplifiers. The resistor matrix also is supplied directly with the wide-band luminance or brightness signal components to produce at the outputs of the three emitter-follower amplifiers the red, green and blue color output signals. Current sources connected to the demodulators and the turn-around circuits supply currents of values such that with zero signal into the demodulators, the net current into the loads is zero. As a result, variation of the resistor values to change the matrix ratios does not affect the direct current output levels from the output emitter-follower amplifiers.

11 Claims, 5 Drawing Figures

COLOR TELEVISION SIGNAL DEMODULATION SYSTEM

BACKGROUND OF THE INVENTION

In the manufacture of electronic devices such as television receivers, it is desirable to utilize solid-state components to the greatest extent possible in order to realize the advantages inherent in such components. One of the circuits in a color television receiver requiring a relatively large number of components is the color demodulator section of the receiver. This portion of the television receiver is used to separate the color difference signals present in the NTSC color television signal. This signal includes a wide-band brightness or luminance (Y) signal, and a modulated subcarrier signal of approximately 3.58 megahertz. The subcarrier signal is phase and amplitude modulated by color difference signals (R–Y, B–Y and G–Y), so that different phases of the subcarrier each represent the hue of the image portion and the subcarrier amplitude at that phase represents the saturation of that hue. A monochrome receiver visibly reproduces only the Y-component.

Integrated circuit synchronous demodulators have been developed for producing color difference signals which are combined with the luminance signals to produce the desired red, green and blue color signals to be reproduced by the cathode ray tube of a television receiver. The outputs of such demodulators, however, generally require additional filter stages to eliminate carrier harmonics produced in the color difference signals by the demodulation process. Integrated circuit synchronous demodulators have been developed in which coupling capacitors are included to reduce or eliminate the carrier harmonics from the color difference signals and also to improve the high frequency performance for the wide-band luminance signal. Without such capacitors, the switching components from the carrier harmonics are quite high; and in addition the brightness frequency response is degraded because of the output capacitance of the demodulator circuit.

It is desirable to provide an integrated circuit color demodulator which produces directly the red, green and blue output signals and which does not require additional filter stages or the inclusion of additional capacitors as part of the circuit to eliminate the residual switching components. In addition, it is desirable to provide an integrated circuit color demodulator which does not degrade the frequency response of the brightness signal components.

SUMMARY OF THE INVENTION

Accordingly, it is an object of this invention to provide an improved demodulator circuit.

An additional object of this invention is to provide a color television integrated circuit demodulator for directly producing a color representative signal.

A further object of this invention is to provide an improved color television demodulator circuit which mixes the correct amount of the luminance portion of a color television signal with the color difference signal to produce red, green and blue outputs directly from the integrated circuit.

It is another object of this invention to eliminate the need for capacitors in a color television signal demodulator for filtering the residual demodulating switching components or for improving the luminance signal frequency response of the demodulator.

In a preferred embodiment of this invention a plurality of individual synchronous gated full wave demodulators produce color difference signals under the control of color reference signals having phases associated with particular colors. Two pairs of switching devices are provided in each demodulator and switching devices of different pairs in the same demodulator have common-connected outputs and are rendered alternately conductive. The common-connected outputs of each of the demodulators are connected through turnaround circuits to an output matrix circuit. The luminance signal components also are applied to the output matrix circuit through equal values of resistance to each of the output amplifiers. The outputs of the turnaround circuits are coupled to the output amplifiers through different values of resistance in accordance with the selected matrix values which are desired.

DETAILED DESCRIPTION

Figure 1:
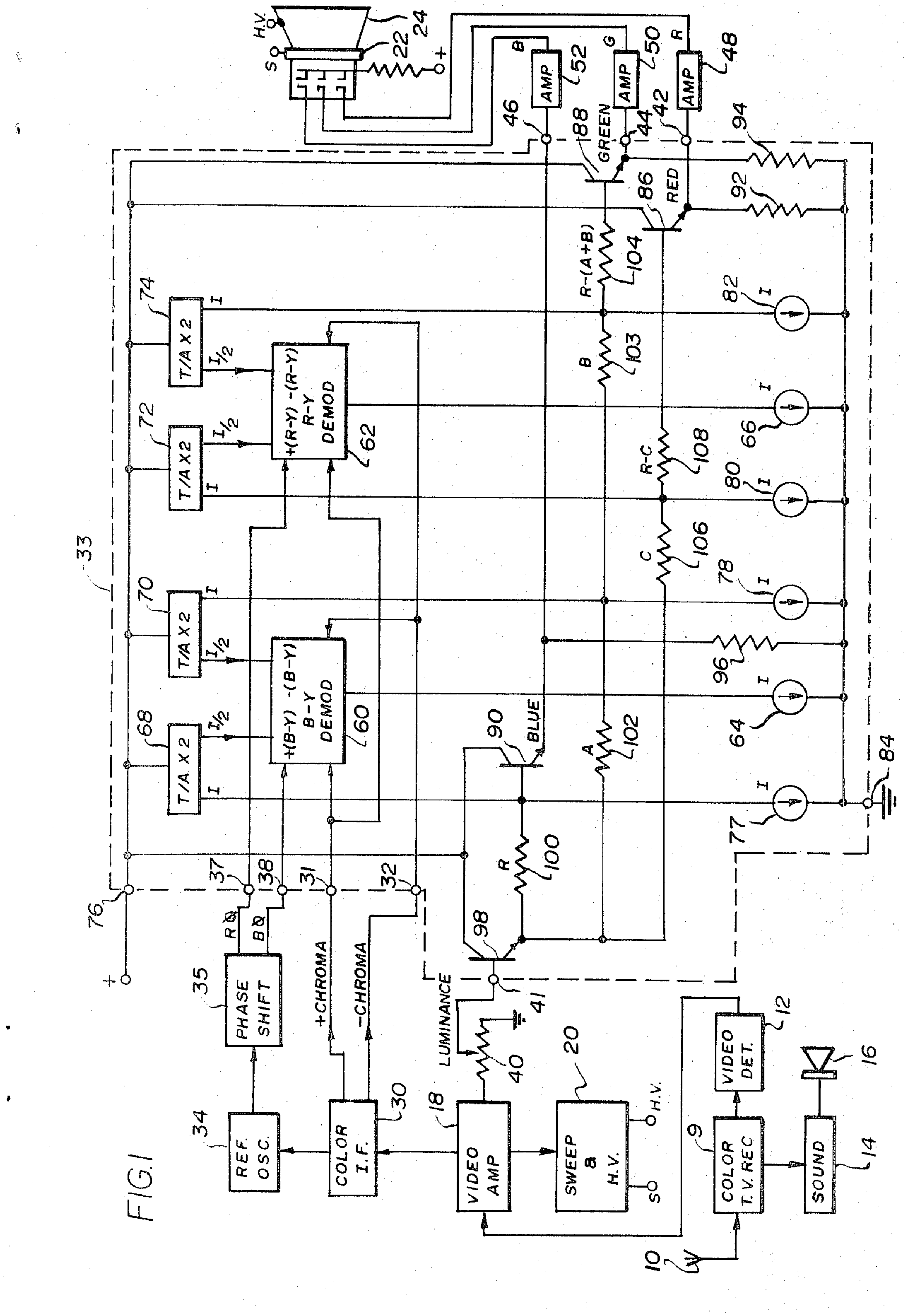
FIG. 1 is a circuit diagram, partially in block form, of a television receiver incorporating a color demodulator system in accordance with a preferred embodiment of the invention.

Referring now to the drawing, a color television receiver 9 is coupled to a suitable antenna 10 to receive a signal and to select, amplify and convert the signal to IF frequency for application to a video detector 12. In addition, the color receiver 9 also is coupled to a sound system 14 which demodulates and amplifies the usual 4.5 megahertz sound subcarrier to drive a speaker 16.

The video detector 12 is coupled to a video amplifier 18, having outputs to the various remaining stages of the receiver. The horizontal and vertical beam synchronizing pulses of the video signal are selected by a sweep and high voltage system 20 which has an output "S" coupled to the deflection yoke 22 on the neck of a three beam color cathode ray tube 24. The system 20 also provides a high voltage output (H.V.) for the screen of the shadow mask of the cathode ray tube 24.

The video amplifier 18 further is coupled to a color subcarrier IF amplifier 30 which includes bandpass filter networks for selecting the color subcarrier at 3.58 megahertz and its associated sidebands. The amplifier 30 includes a gain or color intensity control to furnish a selected amplitude of the chrominance (color) signal components at opposite phases with respect to ground on first and second outputs connected to bonding pads 31 and 32, respectively, of a color demodulator integrated circuit chip 33, shown enclosed within the dotted lines in FIG. 1.

In addition, the color IF amplifier 30 is further coupled to a color synchronizing oscillator 34 which selects the burst signals appearing on the "back porch" of the horizontal synchronizing pulses to develop a color reference signal of 3.58 megahertz for synchronous demodulation of the color signals. The oscillator 34 supplies its output through a phase-shift circuit 35 which has a control for shifting the phases of the two different output signals produced, thereby shifting the demodulation angle and affording a color shift in the reproduced image. The two phase-shifted reference signal outputs are designated in FIG. 1 as R0 and B0 and are applied to input bonding pads 37 and 38, respectively, of the color demodulator integrated circuit 33.

The video amplifier 18 also includes a variable contrast control 40, across a selected portion of which the wide-band composite signal is developed with respect to ground. This signal is applied to a brightness or luminance input bonding pad 41 of the demodulator circuit 33. The demodulator circuit 33 operates to combine the luminance signal components applied to the bonding pad 41 with color difference signals produced therein to form the desired red, green and blue color signals at the outputs of the demodulator on bonding pads 42, 44 and 46, respectively. These three bonding pads are coupled in turn to three output amplifiers 48, 50 and 52, at the outputs of which the video signals representing the amplified red, green and blue color components are developed.

Each of the amplifiers 48, 50 and 52 includes a variable resistor coupled to a different cathode of the three beam cathode ray tube 24, with the cathodes being part of the red, green and blue electron guns in the tube 24. Associated grids for these cathodes are coupled to a suitable bias source, and the tube 24 operates in accordance with known shadow mask principles to reproduce a monochrome or full color image in accordance with the video drive signals applied to it.

In the receiver generally described thus far, there may be further circuitry which is known but which has not been disclosed in order to simplify this disclosure. For example, there can be a gated automatic gain control system, a color killer system for interrupting the amplifier 30 in the absence of the color signal, as well as other circuitry now known in commercially produced color television receivers. It further should be noted that it is preferable for the video detector 12 to be direct current coupled through all of the succeeding amplifiers and demodulators to the cathodes of the picture tube 24 to maintain constant the DC component of the signals processed in the various translation paths.

Located in the integrated circuit demodulator 33 are two gated, synchronous, full-wave demodulators 60 and 62. These demodulators preferably are of the type disclosed in the U.S. Pat. to Gerald K. Lunn No. 3,624,275, issued Nov. 30, 1971. The operation of both of the demodulators 60 and 62 is the same and is described in detail in the aforementioned Lunn patent. For that reason, such operation will not be described in detail here.

The demodulator 60 is indicated as the B–Y demodulator and the demodulator 62 indicator is indicated as the R–Y demodulator. Each of these demodulators produces two outputs, one of which is the positive difference signal and the other of which is the negative difference signal determined by the phase of the reference signal applied to the respective demodulator 60 or 62. As shown in FIG. 1, each of the demodulators 61 and 62 is provided with an operating current I from current sources 64 and 66. Each of the outputs of the demodulators 60 and 62 also are connected through corresponding PNP transistor "turn-around" circuits 68, 70, 72 and 74 which couple the outputs of the demodulators to a bonding pad 76 connected to a source of positive operating potential (not shown).

As shown in FIG. 1, the turn-around circuits 68, 70, 72 and 74 each are shown as supplying a current of $I$ at the output while supplying a current of $I/2$ to the corresponding demodulator output connected to it. The turn-around circuits can take a number of different configurations, some of which are shown in detail in FIGS. 2, 3, 4 and 5. The outputs of the circuits 68, 70, 72 and 74 are connected to respective current sources 77, 78, 80 and 82, each of which draws a current of I. These current sources, along with the current sources 64 and 66, all are coupled to a grounded bonding pad 84 for the chip 33.

By supplying the positive and negative phases of the demodulated color difference signals from the demodulators 60 and 62 through the turn-around circuits 68, 70, 72 and 74, the high frequency spurious, residual switching, or carrier harmonic components in the output signals of the demodulators are effectively filtered out; and only the low frequency demodulated signals are supplied from the outputs of the turn-around circuits. These demodulated signals are in turn coupled to a matrix circuit where they are mixed with the luminance signal components to supply the representative red, green and blue color signals through emitter-follower output transistors 86, 88 and 90 to the bonding pads 42, 44 and 46. The emitters of the transistors 86, 88 and 90 are connected through equal value emitter resistors 92, 94 and 96, respectively, to the grounded bonding pad 84.

The luminance signal components supplied to the bonding pad 41 are coupled to the base of an input NPN transistor 98, the collector of which is connected directly to the bonding pad 76 to which the positive potential is applied, and the emitter of which is connected through a resistor 100 to the base of the emitter-follower transistor 90. The resistor 100 is selected to have a resistance value of R. The +(B–Y) color difference signals obtained from the turn-around circuit 68 also are coupled to the base of the transistor 90 where these signals are mixed with the luminance signal components supplied by the transistor 98. The junction of the resistor 100 with the base of the transistor 90 and the output of the turn-around circuit 68 is coupled to the current source 77.

Similarly, the luminance signal components appearing on the emitter of the transistor 98 are connected through three resistors 102, 103 and 104 having resistance values of $A$, $B$ and $R-(A+B)$, respectively. Thus, the total resistance of the three resistors connected between the emitter of the transistor 98 and the base of the emitter-follower output transistor 88 is a resistance of $R$. The junction between the resistors 102 and 103 is connected to the output of the turn-around circuit 70 and the current source 78. Similarly the junction between the resistors 103 and 104 is connected to the output of the turn-around circuit 74 and the junction of that output with the current source 82. The mixing of the −(B–Y) and the −(R–Y) components from the turn-around circuits 70 and 74 in the amounts selected by the relative values of the resistors 102, 103 and 104 with the luminance signal components provides the desired green output signal relative to the red and blue output signals.

In a similar manner, the luminance signal components on the emitter of the transistor 98 are coupled through a pair of resistors 106 and 108 to the base of the emitter-follower transistor 86. The resistance of the resistor 106 is of a value *c*; while the resistance of the resistor 108 is *R—C*. Thus, the total resistance between the emitter of the transistor 98 and the base of the transistor 86 also is a value of *R*. The +(R–Y) output obtained from the turn-around circuit 72 is coupled to the junction of the resistors 106 and 108 with the current source 80.

It can be seen that the luminance signal components are applied through equal values of total resistance (*R*) to the bases of each of the output emitter-follower transistors 86, 88 and 90. At the same time, the outputs of the demodulators obtained from the turn-around circuits 68, 70, 72 and 74 are connected to the bases of the transistors 86, 88 and 90 through different values of resistance.

It can be seen that by varying the relative values of the resistors 100, 102, 103, 104, 106 and 108 in the matrix, the output signals applied to the amplifiers 48, 50 and 52 can be varied in accordance with the desires of the circuit designer. All that is necessary is that the total resistance between the emitter of the transistor 98 and the bases of each of the emitter follower transistors 86, 88 and 90 is the same. Thus, matrix changes can be made easily without disturbing the DC signal levels. Because of the use of the turn-around circuits, it is also possible to obtain output voltage swings which are nearly equal to the supply voltage so that lower supply voltages may be used with this circuit and still maintain a large signal output voltage capability.

In addition, it should be noted that the wide-band brightness or luminance signal components are directly fed to the matrix and are not supplied through any filtering circuits; so that there is no reduction in bandwidth of the luminance signal. This is especially important since the brightness or luminance signal components can extend in frequency up to or into the chrominance carrier sidebands. At the same time, the PNP transistor turn-around circuits 68, 70, 72 and 74 effectively filter the switching or residual carrier signal components from the demodulated color signal outputs which are supplied through these circuits.

Figure 2:
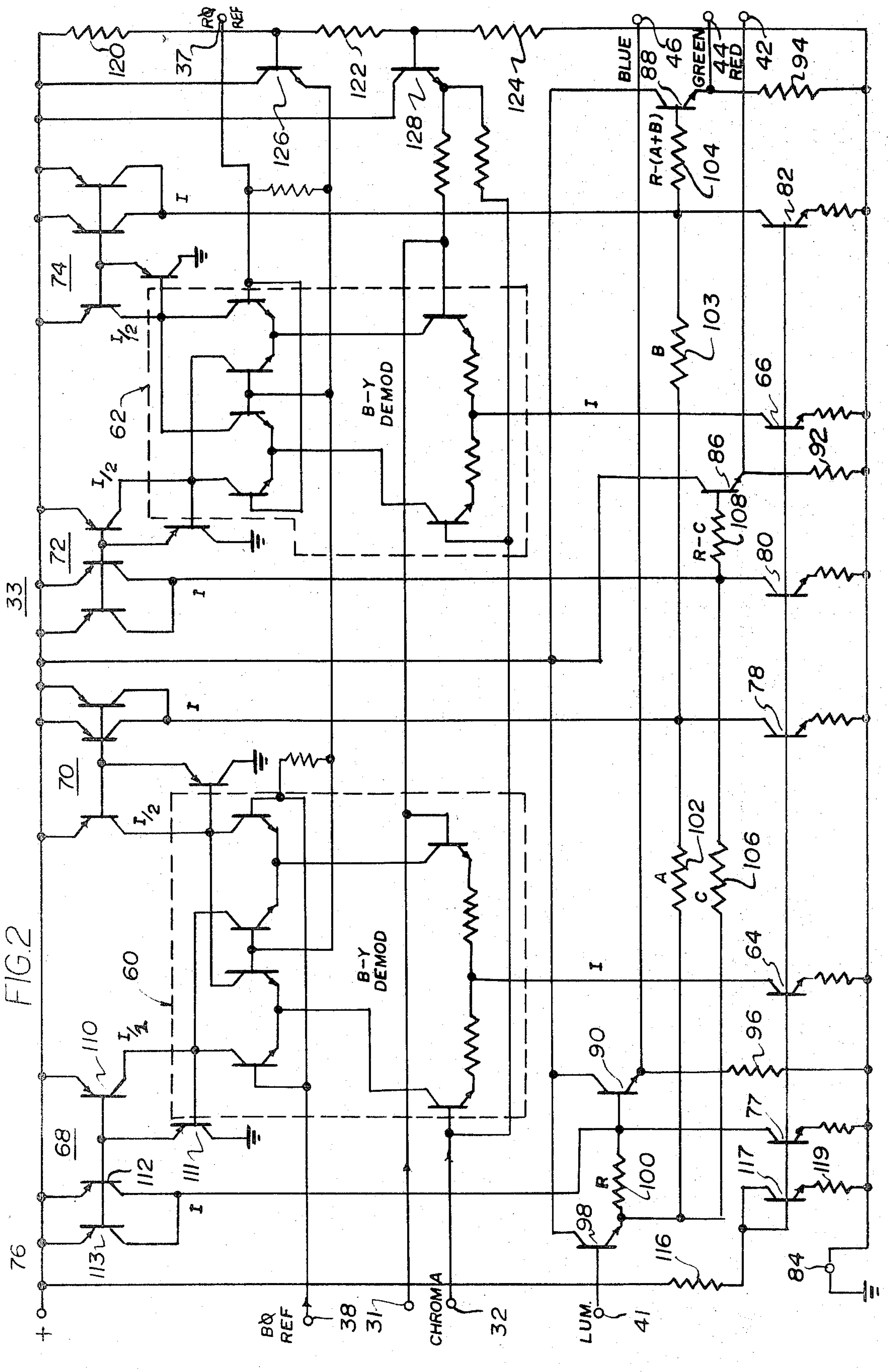
FIG. 2 is a detailed schematic diagram of the color demodulator circuit shown in FIG. 1.

Referring now to FIG. 2, the demodulator circuit 33 is shown in greater detail with all of the individual transistors of the demodulators 60 and 62 being shown along with the individual transistors and circuit interconnections of the turn-around circuits 68, 70, 72 and 74. As stated previously, the demodulators 60 and 62 are full-wave, synchronous demodulators of the type described in the aforementioned Lunn patent so that no description of the detailed circuit operation of these demodulators will be given here. The same reference numbers are used in FIG. 2 as were used in FIG. 1 to designate the same or similar components.

Each of the turn-around circuits shown in FIG. 2 are the same; so that only the turn-around circuit 68 will be described in detail, it being understood that this description applies equally as well to the circuits 70, 72 and 74. The turn-around circuit 68 includes a first PNP transistor 110 supplying current *I*/2 to the +(B–Y) output of the demodulator 60. The collector of the transistor 110 also is connected to the base of a PNP transistor 111, the collector of which is connected to ground and the emitter of which is connected to the base of the transistor 110. This connection with the base of the transistor 110 also is applied to a pair of parallel-connected PNP transistors 112 and 113 which have common-connected bases, emitters and collectors. The reason for this parallel connection is that the geometry of all of the transistors 110, 112 and 113 is the same, so that each supplies a current of *I*/2. This results in a current of I from the output of the turn-around circuit 68 from the transistors 112 and 113 connected in parallel.

The constant current sources for the turn-around circuits 68, 70, 72 and 74 and for the demodulators 60 and 62 are shown as NPN transistor current sources in FIG. 2. These current sources are each biased to provide an operating current I (as also shown in FIG. 1) from a divider circuit connected between the bonding pad 76 and the grounded bonding pad 84. This divider circuit includes a resistor 116, an NPN transistor diode 117, and a resistor 119 connected in series. The manner in which this circuit operates to bias each of the current source transistors 64, 66, 77, 78, 80 and 82 is conventional and well known.

Other details shown in the circuit of FIG. 2 are the circuits for providing the operating bias for the various transistors in the stages of the demodulator circuit 60 and 62. This operating bias is obtained from a voltage divider comprising three resistors 120, 122 and 124 connected in series between the bonding pads 76 and 84. The junction between the resistors 120 and 122 is applied to the base of an NPN amplifier transistor 126, the emitter of which is coupled to the bases of one transistor in each of the upper pairs of switching transistors in the demodulator circuits 60 and 62 to provide a bias or reference potential for those switching transistors. Similarly, the junction between the resistors 122 and 124 is coupled through an NPN transistor 128 which supplies a bias or reference potential to the bases of the lower pair of transistors in each of the demodulator circuits 60 and 62. The manner in which this is done is well known, and the details of this circuit are shown in FIG. 2 merely to illustrate the manner in which the various circuit interconnections of the block diagram of FIG. 1 are effected between the demodulators, the turn-around circuits, and the matrix which is shown in detail in both FIG. 1 and FIG. 2.

Figure 3:
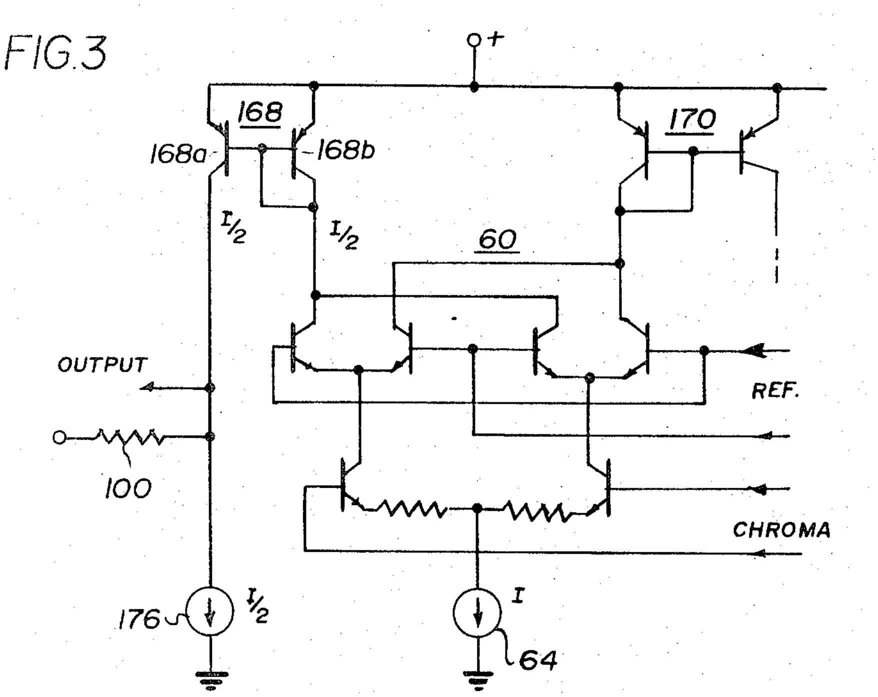
FIGS. 3, 4 and 5 show details of variations which can be made to portions of the circuit shown in FIG. 2

Referring now to FIG. 3, there is shown a modification of a portion of the circuit illustrated in FIG. 2. In FIG. 3 the same reference numbers are used to designate the same or similar components shown in FIGS. 1 and 2. In FIG. 3 the turn-around circuits 168 and 170 each supply a current of *I*/2 at their outputs. This current is equal to the current which is supplied by the turn-around circuits 168 and 170 to the corresponding outputs of the demodulator circuit 60. It will be understood that comparable turn-around circuits can be utilized in conjunction with the demodulator 62 as well. The full demodulator circuit 33 has not been shown in FIG. 3, however, in order to avoid unnecessarily complicating this description.

As shown in FIG. 3, the turn-around circuit 168 (or 170) is a simple PNP turn-around circuit employing a PNP transistor diode **168*b* connected between the positive source of potential and the corresponding output of the demodulator circuit. A single PNP transistor 168*a* is provided on the output side of the turn-around circuit, with its base coupled in common to the base of the transistor 168*b*.** As a consequence, the transistor 168*a* supplies a current of value $I/2$ at its output. The current source 77 shown in FIGS. 1 and 2 has been replaced with a current source 176 which supplies a current of $I/2$ instead of a current value of $I$. In all other respects the circuit operates in the same manner as does the circuit shown in FIGS. 1 and 2.

Figure 4:
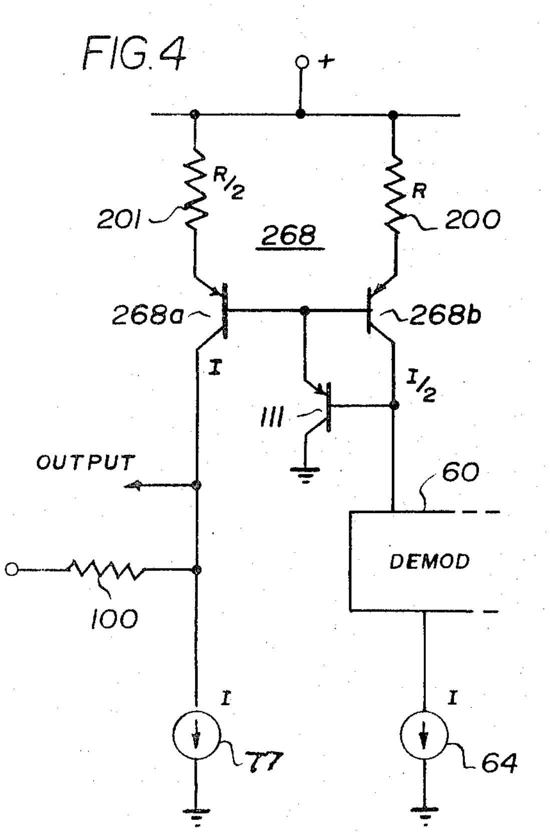
Figure 5:
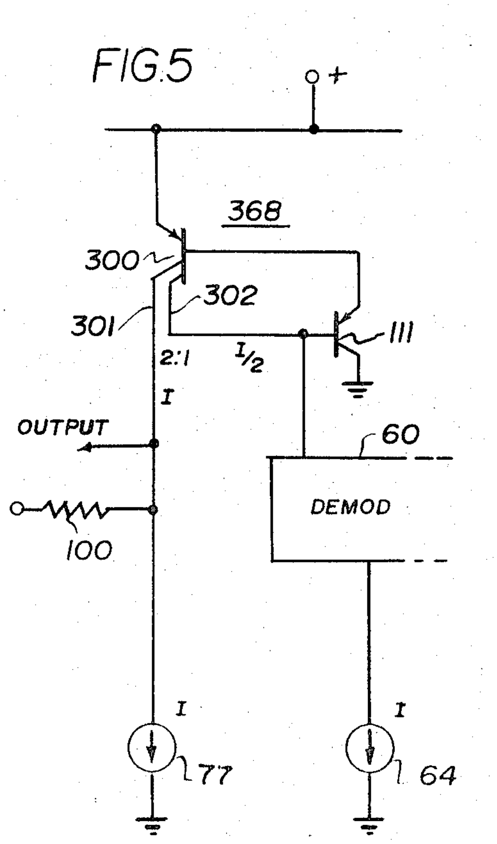

FIGS. 4 and 5 show other variations of turn-around circuits which may be employed in place of the ones illustrated in FIGS. 2 and 3. In FIG. 4 the turn-around circuit once again is constructed to supply a current of value $I$ at its output, as does the circuit shown in FIG. 2. In FIG. 4, however, the turn-around circuit 268, which is similar to the turn-around circuit 68 of FIG. 2, employs three PNP transistors 268*a*, 268*b* and 111 interconnected in a manner similar to the interconnections of the transistors 110, 111 and 112 of FIG. 2. The transistors 268*a* and 268*b* are selected to have the same characteristics or geometry. As a consequence, with no other provisions being made, the circuit of FIG. 4 would operate to supply a current of $I/2$ at its output. To overcome this, the transistor 268*b* is connected to the positive source of potential through a resistor 200 having a value of $R$, while the emitter of the transistor 268*a* is connected to the positive supply through a resistor 201 having a value of $R/2$. This ratio of the value of the resistors 200 and 201 causes a current $I$ to be supplied by the transistor 268*a*. This produces the same result as the parallel transistor connections of the transistors 112 and 113 used in the circuit of FIG. 2.

Referring now to FIG. 5, another variation of a turn-around circuit which can be employed is shown in which a dual-collector lateral PNP transistor having a collector ratio of 2:1 (that is, the area of one collector is twice that of the other) is employed to achieve the same results which are obtained with the circuits shown in FIGS. 2 and 4. In FIG. 5, the dual-collector lateral PNP transistor has its base connected to the emitter of the transistor 111 in a manner similar to the connections made with the transistor 110 of FIG. 2. The collector 302 of the transistor 300 is connected to the corresponding output of the demodulator circuit 60. The other collector 301 of the transistor 300 is coupled to the current source 77 as the output at the junction thereof with the resistor 100. The collector 301 has an area which is twice the area of the collector 302; so that when a current of $I/2$ is supplied by the collector 302 to the demodulator 60, a corresponding current of value $I$ is supplied by the collector 301 to the output of the turn-around circuit.

It is to be understood that the circuits shown in FIGS. 3, 4 and 5 are representative of the interconnections of the turn-around circuits which may be employed. If the turn-around circuits of any of these three figures are desired to be used in place of those which have been shown in FIG. 2, it merely is necessary to replace the corresponding turn-around circuits 68, 70, 72 and 74 with one of the circuits shown in FIGS. 3, 4 or 5.

The circuits which have been described above operate so that in the quiescent operating condition (no chrominance signal supplied to the demodulators) the net current into the loads is zero. As a result, variations of the resistor values to change matrix ratios does not affect the direct current output levels on the bonding pads 42, 44 and 46. In addition, the temperature coefficient of the outputs depends only on the luminance signal source and the emitter-follower transistors 86, 88, and 90 apart from slight errors in current matching.

The temperature coefficient does not depend on resistor matching of the matrix resistors.

I claim:

1. A demodulator system including in combination:

at least one synchronous demodulator having at least two inputs and at least one output;

means coupled with one of the inputs of said demodulator for supplying a modulated carrier signal thereto;

means coupled with the other of the inputs of said demodulator for supplying a reference signal thereto at the frequency of said carrier signal;

PNP transistor turn-around circuit means coupled with the output of said demodulator; and utilization circuit means coupled with said turn-around circuit means for utilizing the output thereof.

2. A demodulator system for a color television receiver for composite signals including at least luminance signal components and chrominance subcarrier signal components phase and amplitude modulated with hue and saturation information of a television image, said demodulator system including in combination:

at least one demodulator having first and second inputs and at least one output;

means coupled to one of the inputs of said demodulator for supplying a modulated subcarrier signal thereto;

means coupled to the other input of said demodulator for supplying a reference signal thereto at the frequency of said subcarrier signal and at a predetermined phase relative to the subcarrier signal;

PNP transistor turn-around circuit means coupled with the output of said demodulator;

emitter-follower circuit means having an input and an output; and means coupling said turn-around circuit means with the input of said emitter-follower circuit means.

3. The combination according to claim 2 further including means coupled with the input of said emitter-follower circuit means for supplying said luminance signal components thereto.

4. The combination according to claim 2 wherein said demodulator comprises a full wave demodulator including two pairs of switching devices, with the outputs of one pair of switching devices coupled in common with different ones of the outputs of the other pair of switching devices to form first and second outputs of said demodulator;

said means for supplying the modulated subcarrier signal supplies such subcarrier signal at opposite phases to the two pairs of switching devices in said demodulator;

said reference signal is supplied to the switching devices of said demodulator, with the common-connected switching devices being alternately rendered conductive at the subcarrier frequency for providing normal and inverted output signals on said first and second outputs; and said turn-around circuit means is coupled with at least one of said first and second outputs of said demodulator.

5. The combination according to claim 3 including first and second full wave synchronous demodulators each including two pairs of switching devices, with the outputs of one pair of switching devices in each demodulator being coupled in common with different ones of the outputs of the other pair of switching devices to form first and second outputs for each of said demodulators, turn-around circuit means coupled with each of said outputs of said first and second demodulators; wherein said emitter-follower circuit means includes first, second and third emitter-follower circuits each having an input and an output; said means for supplying said luminance signals comprises first, second and third resistor means, each having the same value of resistance, coupled between the inputs of said first, second and third emitter-follower circuits, respectively, and a source of luminance signal components; and said turn-around circuit means comprises first and second turn-around circuits coupled with the first and second outputs, respectively, of each of said demodulators, said first turn-around circuit coupled with the first output of said first demodulator being coupled with the input of said first emitter-follower circuit means, said first turn-around circuit coupled with the first output of said second demodulator being coupled with the input of said second emitter-follower circuit means; and both of the second turn-around circuits coupled with the second outputs of said first and second demodulators being coupled to the input of said third emitter-follower circuit means.

6. The combination according to claim 5 wherein said third resistor means includes a plurality of sections having at least first and second intermediate taps to which the outputs of said others of said turn around circuit means are connected.

7. The combination according to claim 4 further including first and second voltage supply terminals and first, second and third current source means; wherein said turn-around circuit means comprises first and second turn-around circuits coupling the first and second outputs, respectively, of said demodulator with said first voltage supply terminal; said first current source means is coupled between said demodulator and said second voltage supply terminal for supplying operating current to said demodulator; and second and third current source means are coupled between said first and second turn-around circuits, respectively, and said second voltage supply terminal.

8. The combination according to claim 7 wherein said switching devices of said demodulator comprise NPN transistors and said first and second turn-around circuits comprise PNP turn-around circuits.

9. In a color television receiver for receiving composite signals including at least luminance signal components and chrominance subcarrier signal components phase and amplitude modulated with hue and saturation information of a television image, a demodulator system including in combination:

first and second demodulator means each having normal and inverted outputs for deriving from said subcarrier signal components a pair of balanced signals representing two color components of the television image;

first, second and third emitter-follower output circuit means;

first, second and third resistance means each having the same total value of resistance, said first, second and third resistance means having taps thereon;

means for supplying said luminance signal components through said first, second and third resistance means to the inputs of said first, second and third emitter-follower output circuit means, respectively;

means coupling one of the outputs of said first demodulator means with the input of said first emitter-follower circuit means at a predetermined tap on said first resistance means;

means coupling one of the outputs of said second demodulator means with the input of said second-emitter follower circuit means at a predetermined tap on said second resistance means; and means coupling the other outputs of said first and second demodulator means with the input of said third emitter-follower circuit means at different predetermined taps on said third resistance means.

10. The combination according to claim 9 wherein said means coupling the outputs of said demodulator means with the inputs of said emitter-follower circuit means comprise first, second, third and fourth PNP transistor turn-around circuits, respectively.

11. The combination according to claim 10 further including first, second, third, fourth, fifth, and sixth current sources; said first and second current sources coupled between said first and second demodulator means, respectively, and a voltage supply terminal for supplying a predetermined current to each of said first and second demodulator means; and said first, second, third and fourth turn-around circuits coupled through said third, fourth, fifth and sixth current sources, respectively, to said voltage supply terminal; with said first and second current sources supplying the same value of current, and said third, fourth, fifth and sixth current sources supplying the same value of current with a predetermined relationship between said values of current.

* * * * *